US012770336B2

(12) United States Patent
Kim et al.

(10) Patent No.: US 12,770,336 B2
(45) Date of Patent: Oct. 20, 2026

(54) IDENTIFICATION INFORMATION GENERATION METHOD AND APPARATUS FOR VIRTUAL SPACE

(71) Applicant: INDUSTRY ACADEMY COOPERATION FOUNDATION OF SEJONG UNIVERSITY, Seoul (KR)

(72) Inventors: Jae Ho Kim, Seongnam-si (KR); Soo Rim Yang, Seoul (KR); Hyeong Jun Joo, Seoul (KR); Hyeon Ji Kim, Seoul (KR); So Hyun Lee, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 83 days.

(21) Appl. No.: 18/928,705

(22) Filed: Oct. 28, 2024

(65) Prior Publication Data

US 2025/0139903 A1 May 1, 2025

(30) Foreign Application Priority Data

Oct. 30, 2023 (KR) ........................ 10-2023-0146466

(51) Int. Cl.
*G06T 19/00* (2011.01)
*G06T 3/4038* (2024.01)
(Continued)

(52) U.S. Cl.
CPC ............ *G06T 19/00* (2013.01); *G06T 3/4038* (2013.01); *G06T 7/55* (2017.01); *G06T 7/73* (2017.01); *G06T 2200/04* (2013.01); *G06T 2207/10032* (2013.01); *G06T 2207/30184* (2013.01); *G06T 2219/004* (2013.01)

(58) Field of Classification Search
CPC ......... G06T 2200/04; G06T 7/55; G06T 7/73; G06T 19/00; G06T 3/4038; G06T 2207/10032; G06T 2210/61; G06T 17/05; G06T 2219/004; G06T 2207/30184; G06T 19/003; G06T 19/20; G06F 3/011; G06F 3/04815; G06F 3/0485; G06Q 50/10; G06V 20/17; H04N 2013/0088
See application file for complete search history.

(56) References Cited

U.S. PATENT DOCUMENTS 9,671,938 B2 * 6/2017 Seitz .................. G06F 3/04815
9,767,589 B1 * 9/2017 Siegel ..................... G06T 11/65
(Continued)

FOREIGN PATENT DOCUMENTS

KR 100349676 B1 8/2002
KR 10-2022-0064524 A 5/2022
(Continued)

*Primary Examiner* — Phi Hoang

(57) ABSTRACT

Disclosed are a method and apparatus for generating identification information for a virtual space that are capable of supporting users in searching for a virtual space. The method of generating identification information for a virtual space includes: setting a plurality of crawling points for each crawling area in a three-dimensional virtual grid shape for a virtual space; collecting at least one of a street view image and an aerial view image in a preset direction at the crawling point; and generating a spatial descriptor for each of the crawling points from the collected image.

7 Claims, 6 Drawing Sheets

(51) Int. Cl.
*G06T 7/55* (2017.01)
*G06T 7/73* (2017.01)

(56) References Cited

U.S. PATENT DOCUMENTS

| | | | | |
|---|---|---|---|---|
| 9,898,857 | B2 * | 2/2018 | Dillard | G06T 15/503 |
| 2014/0062998 | A1 * | 3/2014 | Ofstad | G01C 21/3638<br>345/419 |
| 2014/0350846 | A1 * | 11/2014 | Stroila | G01C 21/367<br>701/454 |
| 2017/0287214 | A1 * | 10/2017 | Anderson | G06F 3/011 |
| 2020/0020172 | A1 * | 1/2020 | Rogers | G06T 19/006 |

FOREIGN PATENT DOCUMENTS

| | | | |
|---|---|---|---|
| KR | 102484939 | B1 | 1/2023 |
| KR | 1020230077841 | A | 6/2023 |

* cited by examiner

IDENTIFICATION INFORMATION GENERATION METHOD AND APPARATUS FOR VIRTUAL SPACE

CROSS-REFERENCE TO RELATED APPLICATION

This application claims priority to and the benefit of Korean Patent Application No. 2023-0146466, filed on Oct. 30, 2023, the disclosure of which is incorporated herein by reference in its entirety.

BACKGROUND

1. Field of the Invention

The present disclosure relates to the metaverse, and more specifically, to a method and apparatus for generating identification information for a virtual space to search for a virtual space.

2. Discussion of Related Art

"Metaverse" is a portmanteau of "meta," which refers to conceptualization and transcendence, and "universe," which refers to the world, and the word refers to a digital or transcendent world in which virtuality and reality are fused together. Recently, with the development of 5G technology and virtual technology (augmented reality: AR/virtual reality: VR), the metaverse has emerged as a virtual convergence space in which people engage in leisure activities and economic activities.

With the development of metaverse technology, service for various virtual spaces is being provided, and the number of virtual spaces for which service is provided is expected to increase further in the future. As the number of virtual spaces for which service is provided increases, there is a demand for a search method that allows users to search for a virtual space for which the user desires service from among various virtual spaces.

SUMMARY OF THE INVENTION

The present disclosure is directed to providing a method and apparatus for generating identification information for a virtual space that are capable of improving user accessibility to a virtual space and supporting users in searching for a virtual space.

The technical objectives of the present disclosure are not limited to the above, and may be variously expanded without departing from the technical concept and field of the present disclosure.

According to an aspect of the present disclosure, there is provided a method of generating identification information for a virtual space, which includes: setting a plurality of crawling points for each crawling area in a three-dimensional virtual grid shape for a virtual space; collecting at least one of a street view image and an aerial view image in a preset direction at the crawling point; and generating a spatial descriptor for each of the crawling points from the collected image.

According to an aspect of the present disclosure, there is provided a method of generating identification information for a virtual space, which includes: setting a street view crawling point and an aerial view crawling point for a virtual space; obtaining a street view image in a preset direction at the street view crawling point, and collecting an aerial view image in a preset direction at the aerial view crawling point; and generating spatial descriptors for each of the street view crawling point and the aerial view crawling point from each of the street view image and the aerial view image.

According to an aspect of the present disclosure, there is provided an apparatus for generating identification information for a virtual space, which includes: a memory; and at least one processor electrically connected to the memory, wherein the processor collects at least one of a street view image and an aerial view image in a preset direction at a plurality of crawling points that are set for each crawling area in a three-dimensional virtual grid shape for a virtual space, and generates a spatial descriptor for the crawling point from the collected image.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
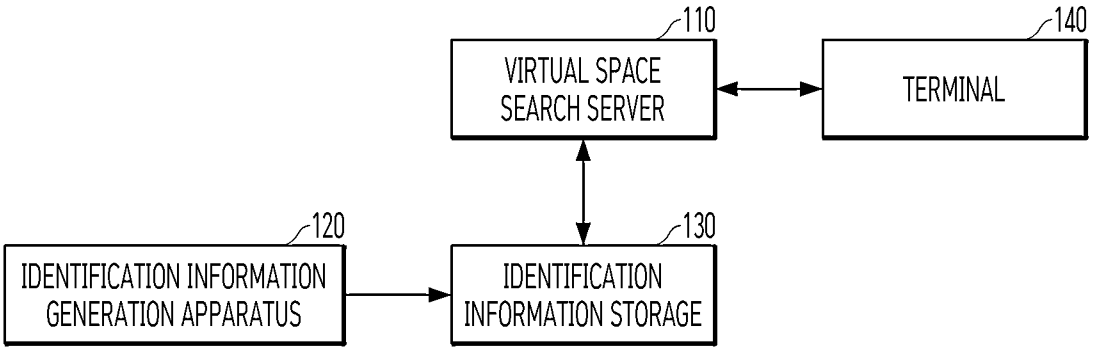
FIG. 1 is a view for describing a virtual space search system according to an embodiment of the present disclosure.

While embodiments according to the concept of the present disclosure are susceptible to various modifications and alternative forms, specific embodiments thereof are shown by way of embodiment in the drawings and will herein be described in detail. It should be understood, however, that there is no intent to limit the embodiments according to the concept of the present disclosure to the particular forms disclosed, but on the contrary, the embodiments according to the concept of the present disclosure are to cover all modifications, equivalents, and alternatives falling within the spirit and scope of the disclosure. Like numbers refer to like elements throughout the description of the drawings.

Hereinafter, embodiments according to the present disclosure will be described in detail with reference to the accompanying drawings.

FIG. 1 is a view for describing a virtual space search system according to an embodiment of the present disclosure.

Referring to FIG. 1, the virtual space search system according to the embodiment of the present disclosure includes a virtual space search server 110, an identification information generation apparatus 120, an identification information storage 130, and a terminal 140.

The terminal 140 may provide the virtual space search server 110 with an image of a target space, and request a search for the target space. The virtual space search server 110 may search for the target space in a virtual space according to the search request for the target space received from the terminal 140 and provide the found target space to the terminal 140. Here, the virtual space may be a virtual space for which service is provided from various metaverse platforms.

In an embodiment, the virtual space search server 110 may perform a search using identification information for the virtual space. The identification information for the virtual space may be generated by the identification information generation apparatus 120 and stored in the identification information storage 130, and according to an embodiment, the virtual space search server 110 may generate the identification information for the virtual space. The identification information for the virtual space may be generated and assigned for each crawling area in a three-dimensional virtual grid shape and for each crawling point set within the crawling area.

The virtual space search server 110 extracts identification information from the image of the target space and searches for identification information for a virtual space corresponding to the extracted identification information in the identification information storage 130. A space for a crawling point corresponding to the found identification information may be provided to the user as a search result.

Figure 2:
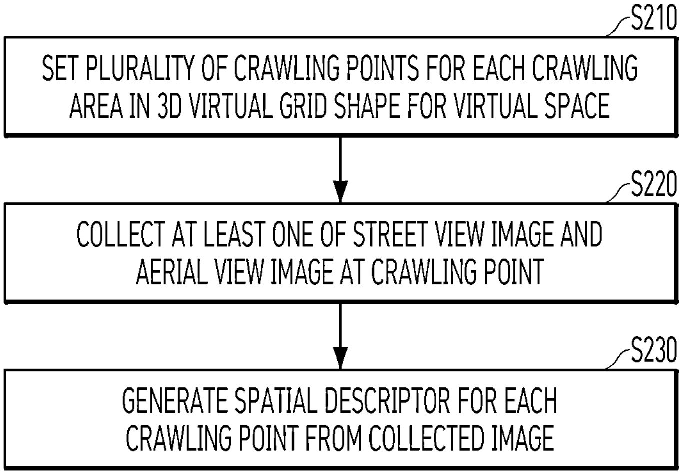
FIG. 2 is a view for describing a method of generating identification information for a virtual space according to an embodiment of the present disclosure.

FIG. 2 is a view for describing a method of generating identification information for a virtual space according to an embodiment of the present disclosure.

The method of generating identification information according to the embodiment of the present disclosure may be performed in a computing device including a memory and a processor electrically connected to the memory, and the above described identification information generation apparatus is an example of such a computing device.

The computing device according to the embodiment of the present disclosure sets crawling points for a virtual space (S210). The computing device may set a plurality of crawling points for each crawling area in a three-dimensional virtual grid shape for a virtual space, and according to an embodiment, may set crawling points without setting separate crawling areas. The crawling point may include an aerial view crawling point for collecting aerial view images and a street view crawling point for collecting street view images.

The computing device collects at least one of a street view image and an aerial view image in a preset direction at the crawling point (S220). A street view image may be collected at the street view crawling point, and an aerial view image may be collected at the aerial view crawling point. The street view image may be an image taken from the ground in the virtual space, for example, an image taken by a virtual mobile robot. The aerial view image may be an image taken from the airspace in the virtual space, for example, an image taken by a virtual drone.

The computing device generates identification information, i.e., a spatial descriptor, for each crawling point from the image collected in operation S220 (S230). The computing device may, as an example, generate a spatial descriptor directly from the collected image or may convert the collected image and generate a spatial descriptor from the converted image, and the computing device may convert the collected image into a depth image and generate a spatial descriptor for each crawling point from the depth image.

Crawling Areas

Figure 3:
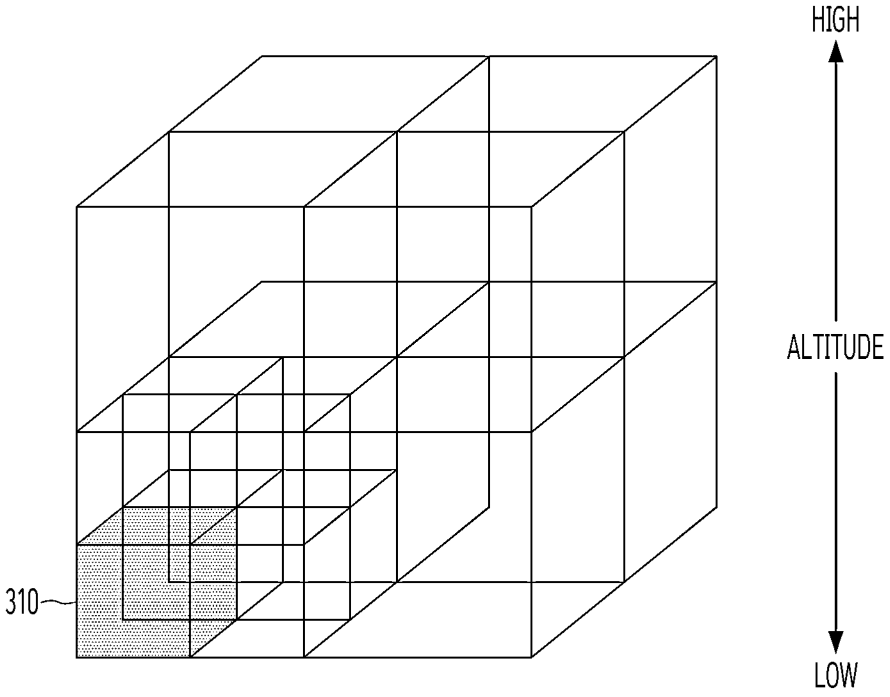
FIG. 3 is a view illustrating crawling areas according to an embodiment of the present disclosure.

FIG. 3 is a view illustrating crawling areas according to an embodiment of the present disclosure, in which the computing device may divide a virtual space into three-dimensional virtual grids as shown in FIG. 3 and set each virtual grid for the virtual space as a crawling area.

The three-dimensional virtual grids may, as an example, be grids having an octree structure, and the size of the crawling area, i.e., the size of the virtual grid, may be set proportional to the altitude of the crawling area. In other words, the size of a crawling area that is relatively close to the ground may be set to be smaller than the size of a crawling area at a high altitude relatively far from the ground.

The lowest crawling area 310 among the crawling areas is an area that includes the ground of the virtual space, the street view crawling points may be set in the lowest crawling area 310 among the crawling areas, and the aerial view crawling points may be set for all crawling areas.

Crawling Points

Figure 4:
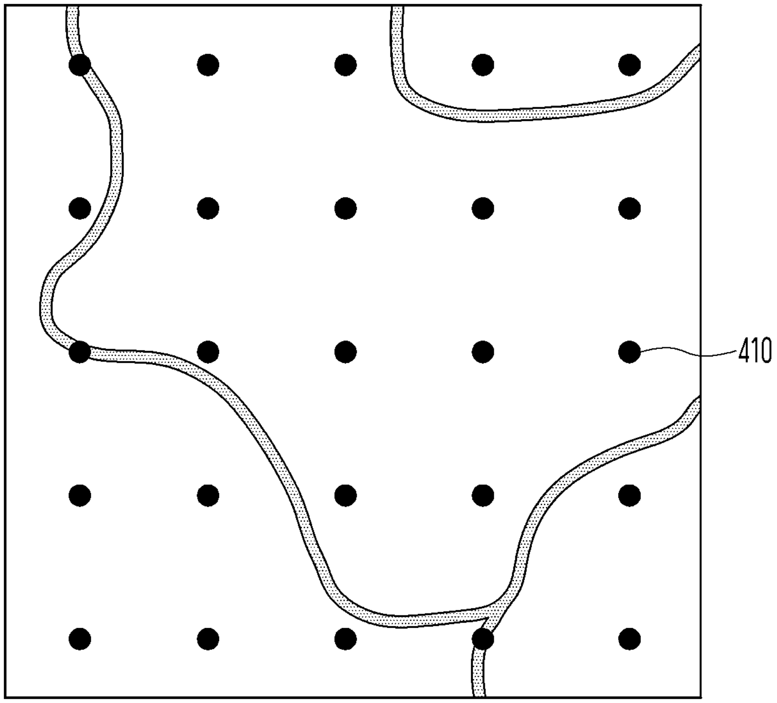
FIG. 4 is a view for describing aerial view crawling points according to an embodiment of the present disclosure.
Figure 5:
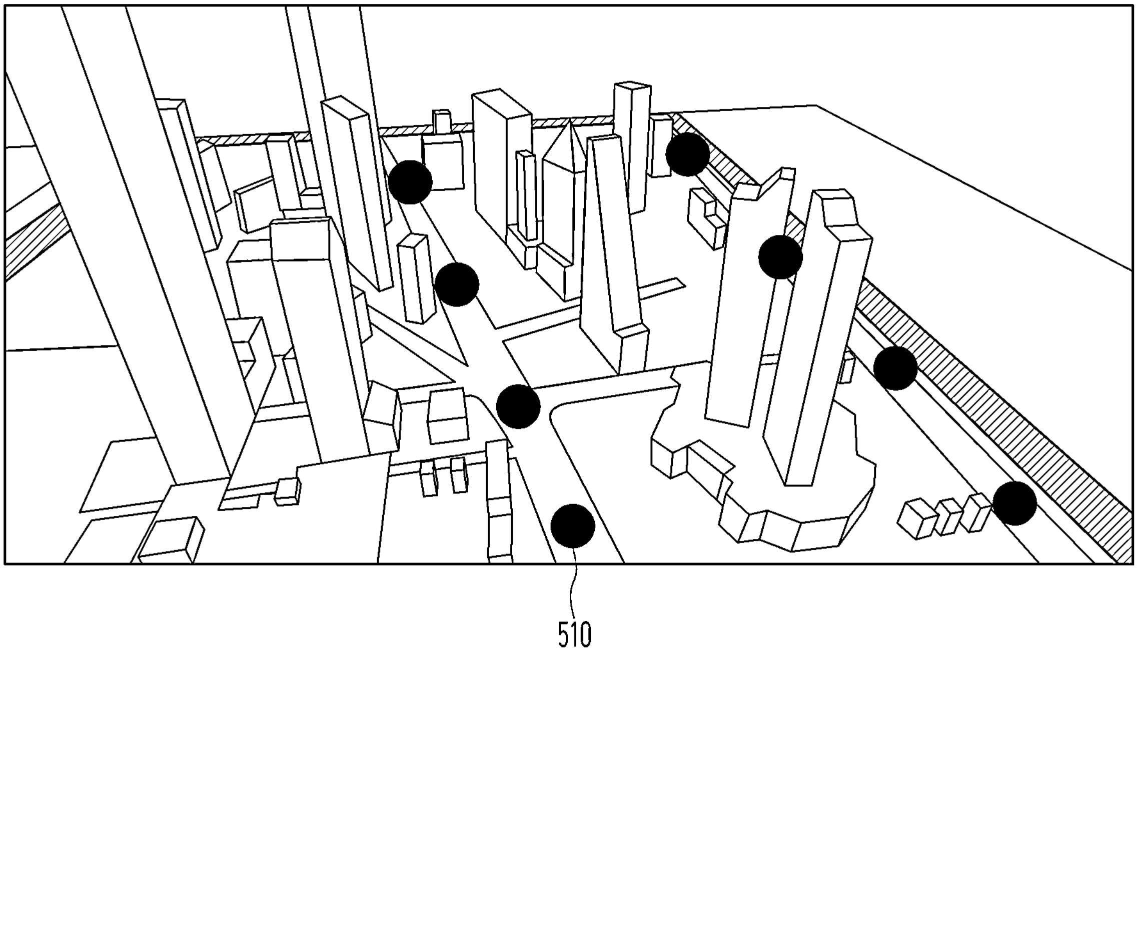
FIG. 5 is a view for describing street view crawling points according to an embodiment of the present disclosure.

FIG. 4 is a view for describing aerial view crawling points according to an embodiment of the present disclosure, and FIG. 5 is a view for describing street view crawling points according to an embodiment of the present disclosure. In FIG. 4, aerial view crawl points are indicated on the virtual map.

The aerial view crawling points 410 may be set at at least one preset altitude in the crawling area, and may be set to be spaced a preset interval from each other as shown in FIG. 4 such that the virtual drone may move while scanning the entire crawling area. The virtual drone may generate aerial view images at the aerial view crawling points 410 set as shown in FIG. 4, and may obtain aerial view images while moving the aerial view crawling points 410 in a preset pattern.

In addition, the number of the aerial view crawling points 410 may be set to be proportional to the size of the crawling area and inversely proportional to the altitude of the aerial view crawling points 410. In other words, the higher the set position of the aerial view crawling point, the fewer aerial view crawling points there may be.

Street view crawling points 510 may be set to a virtual road and a virtual intersection that are included in the lowest crawling area. The street view crawling points set on the virtual road may be set to be spaced a preset interval from each other.

The interval of the street view crawling points set on the virtual road may be variously determined depending on the embodiment, and may be adjusted according to a street environment. The street environment may be, as an example, the density of virtual buildings around the virtual road. For example, when the density of virtual buildings around the virtual road is high, the interval of the street view crawling points set on the virtual road may decrease, and when the density of virtual buildings around the virtual road is low, the interval of the street view crawling points set on the virtual road may increase.

The computing device may detect a road and an intersection from an aerial view image of the ground, i.e., the street, and may set street view crawling points on the detected road and intersection.

According to an embodiment of the present disclosure, spatial descriptors are generated not only from images of the ground but also from images of the airspace, thereby enabling the generation of precise identification information for a virtual space.

Image Collection

Figure 6:
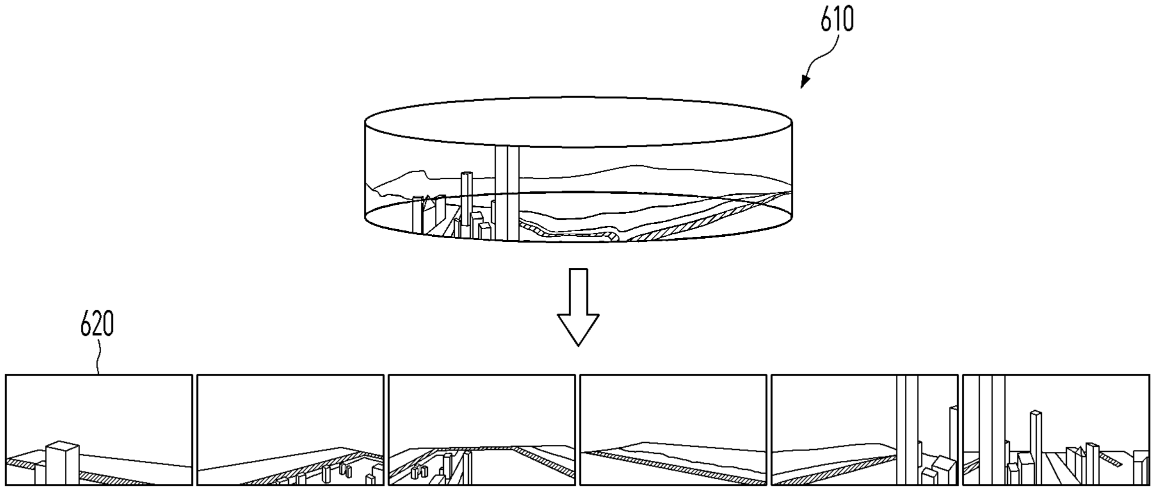
FIG. 6 is a view for describing an image collection method according to an embodiment of the present disclosure.

FIG. 6 is a view for describing an image collection method according to an embodiment of the present disclosure.

As described above, the computing device may use a virtual drone to collect aerial view images and a virtual mobile robot to collect street view images. As shown in FIG. 6, the computing device captures images covering 360 degrees in all directions 610 at an aerial view crawling point using the virtual drone, and then connects the captured images to generate an aerial view image 620 in the form of a panoramic image.

The computing device rotates the virtual drone according to a camera field of view (FOV) of the virtual drone to capture images covering 360 degrees in all directions. The number of captured images is determined according to the camera FOV of the virtual drone. In FIG. 5, an example in which the camera FOV of the virtual drone is 60 degrees and a total of six images are captured is shown.

The virtual mobile robot also captures images covering 360 degrees in all directions at a street view crawling point, and connects the captured images to generate a street view image in the form of a panoramic image.

The computing device rotates the virtual mobile robot according to a camera FOV of the virtual mobile robot to capture the images covering 360 degrees in all directions. The number of the captured images is determined according to the camera FOV of the virtual mobile robot.

According to an embodiment of the present disclosure, by generating spatial descriptors from a 360-degree image in all directions, it is possible to generate precise identification information for the virtual space.

Spatial Descriptors

The computing device converts each of the aerial view image and the street view image in the form of a panoramic image into a depth image, and generates a spatial descriptor for the depth image.

The aerial view image and the street view image are 2D images, and the computing device may generate a depth image using various algorithms that generate depth values from 2D images, and may generate spatial descriptors using various image descriptor generation tools.

According to an embodiment of the present disclosure, by generating identification information based on features of images rather than images, the storage space of the identification information may be reduced.

The technical content described above may be implemented in the form of program instructions executable by various computer means and may be recorded on computer readable media. The computer readable media may be provided with program instructions, data files, data structures, and the like alone or in combination. The program instructions stored in the computer readable media may be specially designed and constructed for the purposes of the present disclosure or may be well known and available to those skilled in the art of computer software. The computer readable storage media include hardware devices configured to store and execute program instructions. For example, the computer readable storage media include magnetic media such as hard disks, floppy disks, and magnetic tape, optical media such as a CD-ROM and a digital video disk (DVD), magneto-optical media such as floptical disks, a ROM, a RAM, a flash memory, etc. The program instructions include not only machine language code made by a compiler but also high level code that can be used by an interpreter etc., which is executed by a computer. A hardware device may be configured to operate as one or more software modules to perform the operations of the embodiments, and vice versa.

As is apparent from the above, according to an embodiment of the present disclosure, spatial descriptors are generated not only from images of the ground but also from images of the airspace, and also are generated from a 360-degree image in all directions, thereby enabling generation of precise identification information for a virtual space.

In addition, according to an embodiment of the present disclosure, identification information is generated based on features of images rather than images, thereby reducing the storage space of the identification information.

While the present disclosure has been shown and described with respect to particulars, such as specific components, embodiments, and drawings, the embodiments are used to aid in the understanding of the present disclosure rather than limiting the present disclosure, and those skilled in the art should appreciate that various changes and modifications are possible without departing from the spirit and scope of the disclosure. Therefore, the spirit of the present disclosure is not defined by the embodiments, and the scope of the present disclosure is to cover not only the following claims but also all modifications and equivalents derived from the claims.

What is claimed is:

1. A method of generating identification information for a virtual space, the method comprising:

setting a plurality of crawling points for each crawling area in a three-dimensional virtual grid shape for a virtual space;

collecting at least one of a street view image and an aerial view image in a preset direction at the crawling point; and generating a spatial descriptor for each of the crawling points from the collected image, wherein the crawling points include:

an aerial view crawling point for collecting the aerial view image; and a street view crawling point for collecting the street view image, wherein the street view crawling point is set in a lowest crawling area among the crawling areas, wherein the street view crawling points are set to be spaced a preset interval from each other on a virtual road included in the lowest crawling area and are set at a virtual intersection included in the crawling area, wherein the setting of the crawling points includes detecting the virtual road and the virtual intersection from an aerial view image of a ground, and setting the street view crawling points on the detected virtual road and the detected virtual intersection.

2. The method of claim 1, wherein the interval of the street view crawling points set on the virtual road is adjusted according to a density of virtual buildings around the virtual road.

3. The method of claim 1, wherein the number of the aerial view crawling points is inversely proportional to an altitude of the aerial view crawling points.

4. The method of claim 1, wherein a size of the crawling area is proportional to an altitude of the crawling area.

5. A method of generating identification information for a virtual space, the method comprising:

setting a plurality of crawling points for each crawling area in a three-dimensional virtual grid shape for a virtual space;

collecting at least one of a street view image and an aerial view image in a preset direction at the crawling point; and generating a spatial descriptor for each of the crawling points from the collected image, wherein the collecting of the at least one of the street view image and the aerial view images includes:

connecting images captured in 360 degrees in all directions using a virtual drone to generate the aerial view image in a form of a panoramic image; and connecting images captured in 360 degrees in all directions using a virtual mobile robot to generate the street view image in a form of a panoramic image.

6. The method of claim 5, wherein the collecting of the at least one of the street view image and the aerial view images includes:

rotating the virtual drone according to a camera FOV of the virtual drone to capture the images covering 360 degrees in all directions; and rotating the virtual mobile robot according to a camera FOV of the virtual mobile robot to capture the images covering 360 degrees in all directions.

7. A method of generating identification information for a virtual space, the method comprising:

setting a plurality of crawling points for each crawling area in a three-dimensional virtual grid shape for a virtual space;

collecting at least one of a street view image and an aerial view image in a preset direction at the crawling point; and generating a spatial descriptor for each of the crawling points from the collected image, wherein the generating of the spatial descriptor includes converting the collected image into a depth image and generating a spatial descriptor for each of the crawling points from the depth image.

* * * * *